May 26, 1942.   A. L. CRUMP ET AL   2,284,561
PRESSURE RELEASE
Filed April 21, 1941
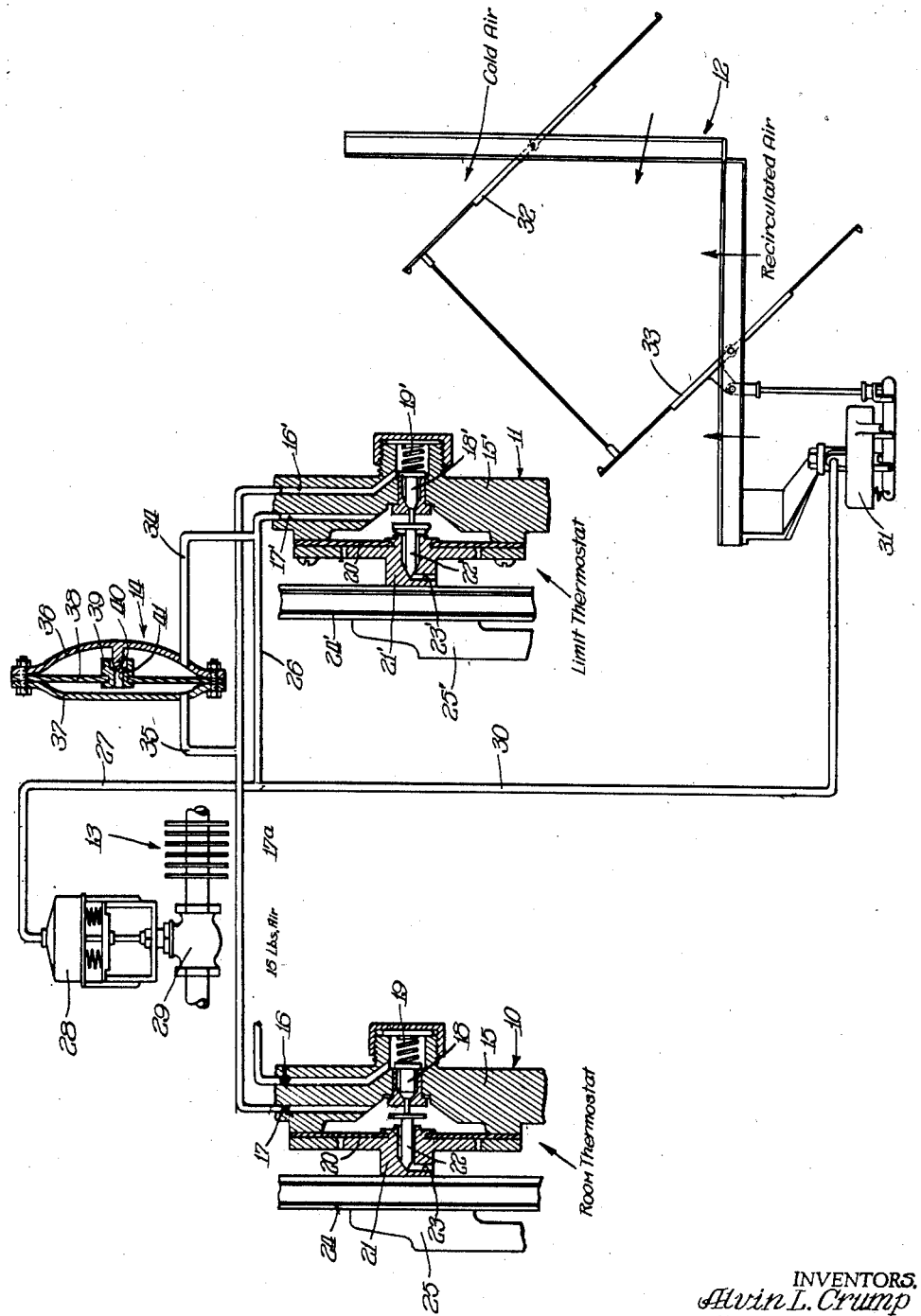
INVENTORS.
Alvin L. Crump
Lyman Crump
BY
Chas. F. Murray Atty.

Patented May 26, 1942

2,284,561

UNITED STATES PATENT OFFICE 2,284,561

PRESSURE RELEASE

Alvin L. Crump, Evanston, and Lyman Crump, Chicago, Ill., assignors to The Powers Regulator Company, Chicago, Ill., a corporation of Illinois Application April 21, 1941, Serial No. 389,614

4 Claims. (Cl. 236—79)

Our invention relates to temperature regulating devices, and particularly to means interposed in a heat regulation system including two or more thermostats to prevent undesirable trapping of air by one thermostat without wasting of air.

In the operation of heat regulating systems, it is common to provide two or more thermostats in series, the thermostats operating under different conditions or at different temperatures. Conditions arise in the operation of such systems where one of the thermostats is, due to temperature conditions surrounding it, incapable of functioning in collaboration with the other thermostat. This tendency toward misoperation has heretofore been overcome by providing a permanent leak in the system, but this is objectionable, requiring as it does, a constant waste of air in order to meet a condition that may arise only in widely separated instances. In order to overcome this difficulty we have devised a simple instrument adapted to be interposed in the connection line, the instrument acting in unusual situations to equalize pressures and thus avoid any unwanted trapping of air and the prevention of abnormal operation.

In order to provide an illustration of a system in which the need for such an instrument is evident, we have shown an arrangement involving the use of a room thermostat, a limit thermostat located in a passage for mixed outdoor and recirculated air, and our instrument interposed in the connecting line. This represents one of numerous systems in which our device is useful.

In the drawing the figure is an illustration, somewhat diagrammatical in form, of a system such as described.

The elements of such a system comprise a primary or room thermostat 10 which may be set to operate at a temperature of 72, a limit or secondary thermostat 11 set to operate at 60, for example; a mixing damper 12, a radiator 13 and our equalizing valve 14.

The thermostats illustrated are of common form and each of the direct-acting type. By this is meant a thermostat which on increase of temperature acts to deliver air under pressure to the return line of the thermostat. These instruments comprise a casing 15 having an inlet passage 16 for air under pressure and a return air passage 17. A valve 18 is held against its seat by a spring 19, and a diaphragm 20 having a face plate 21 carries a valve 22 which controls an exhaust or waste passage 23. A vapor-pressure thermostat disc 24 has its back wall seated against an abutment 25. Inasmuch as the secondary thermostat 11 is identical with that just described, the reference characters applied thereto are the same with the addition of a prime. The thermostats are of the type having "self-lapping" valves; that is, they each have two valves both of which may be closed at one time but both of which may not be open at the same time. This characteristic is covered in the claims by the term "self-lapping valves."

In both thermostats the two valves are shown in closed position; that is, in such position that no air can pass through or out of them. On an increase in temperature at the point of location of the instrument, the thermostatic element 24 will expand, thus moving the diaphragm 20 and serving to unseat the valve 18. Thus the air under pressure in the passage 16 is delivered to the passage 17 and thus to the pipe 17a, this pipe being in communication with the inlet passage 16' of the thermostat 11. The air under pressure that passes through the instrument 11 is delivered from the passage 17' to the pipe 26, thence through a branch 27 to a direct-acting air motor 28 for a steam valve 29. The action is to close the valve which leads to the radiator 13, when pressure is exerted in the instrument 28. A second branch 30 from the pipe 26 leads to a damper-operating motor 31 by means of which the two vanes 32–33 of the mixing damper are operated. The vane 32 controls a cold air inlet and the vane 33 a recirculated air inlet.

The instrument 14 of our invention is interposed across the supply and return of the secondary thermostat 11, a branch 34 connecting to the pipe 26 and a branch 35 connecting to the pipe 17a.

The said instrument 14 comprises two sections 36—37, holding between them a diaphragm 38 carrying a valve seat 39. A valve projection 40 carried by the section 36 co-operates with the valve seat, the valve seat having an opening 41 through which air may pass from the pipe 34 to the pipe 35.

The operation of the system is as follows:

During normal operation with the temperature in the mixing chamber where the thermostat 11 is located, at a point above the setting of the said thermostat, the valve 18' in the said instrument will be open and the instrument 10 will directly control the position of the mixing damper and of the steam valve, opening and closing the same in response to requirements for heat in the room. When, however, the temperature in the room is normal, the instrument 10 will deliver air under pressure through the instrument 11 to the steam valve to close it and to the damper motor to substantially open the cold air inlet.

Assuming then, that on a cold day the temperature in the mixing chamber drops to substantially the setting of the limit thermostat 11; this will close both valves 18'—22' of the instrument 11, thus trapping the air in the steam valve motor and in the damper motor. In the meantime, the room may have continued to be sufficiently warm to involve no change in the condition of the instrument 10. Presently, however, the room becomes decidedly cooler and the thermostat 10 acts to open its valve 22 whereby to exhaust the air from the pipes leading to the controls for the steam and cold air, but since the instrument 11 has trapped the air to the said control motors, no change will be made in their position. Furthermore, no change can take place until the temperature rises or falls in the mixing chamber where the instrument 11 is located. It is thus quite possible that the condition may continue for some period of time, during which the room would become increasingly colder. When, of course, the temperature in the mixing chamber where the limit thermostat is located becomes either colder or warmer than its setting, the trapped air in the control motors will be released. If colder than the setting, the air will be released through the outlet port 23', or if warmer, the trapped air will be returned through the passage 16' and pipe 17a to instrument 10 through which it will be exhausted.

In order to avoid any such trapping, the instrument 14 is interposed across the inlet and outlet from the instrument 11 and any pressure in the outlet or return line from instrument 11 to the control motors is exerted against the diaphragm 38, thus unseating the valve 40 and permitting the air under pressure to escape through the pipes 35 and 17a, thus insuring that at no time can there be a higher pressure in the motor control lines than is present in the return line of the room thermostat.

By reference to thermostats "of the same type" in the accompanying claims we intend to describe instruments that may be both direct-acting or both reverse acting. It will be understood that while we have described and shown thermostats having a capacity for trapping air in a control motor, we intend to comprehend other similar instruments in which the objectionable operation would occur.

It will be understood that while we have shown the instrument in a certain system, this is for illustrative purposes and is not intended as a limitation of its use in other systems of a similar character.

It will also be understood that where we have used the word "thermostats" we intend to include hygrostats and similar instruments arranged in series.

We claim:

1. In temperature control means, the combination of primary and secondary thermostats of the same type having self-lapping valves arranged in a conduit in series and located in different spaces, the return line from the primary thermostat connecting with the supply of the second thermostat, a heat control motor connected to the return from the secondary thermostat, and means interposed across the supply and return lines of the secondary thermostat and tending to equalize pressure when the pressure in the return from the secondary would otherwise be greater than in the supply thereto.

2. In temperature control means, the combination of primary and secondary thermostats of the same type having self-lapping valves arranged in a conduit in series and located in different spaces, the return line from the primary thermostat connecting with the supply of the secondary thermostat, a heat control motor connected to the return from the secondary thermostat, and a device connected across the supply and return lines of the secondary thermostat, said device including a diaphragm and a valve controlled by the diaphragm, said valve being opened by a preponderance of pressure in the return line of the secondary thermostat.

3. In means of the class described, the combination of a high limit control device and a low limit control device both of the same type each having self-lapping valves arranged in series in a pneumatic conduit, valve means controlled by said control devices, and means between the valve control means and the high limit control device for equalizing the operating pressure thereof whenever the pressure acting on the valve control means is greater than the pressure delivered by said high limit control device.

4. In pneumatic control apparatus, the combination of a high limit and a low limit control device both of the same type each having self-lapping valves arranged in a conduit in series and located in different spaces, valve means regulated by said control devices, and means between the valve regulating means and the high limit control device for equalizing the operating pressure thereof whenever the pressure acting on the valve control means is greater than the pressure delivered by said high limit control device.

ALVIN L. CRUMP.
LYMAN CRUMP.